United States Patent Office 3,145,831
Patented Aug. 25, 1964

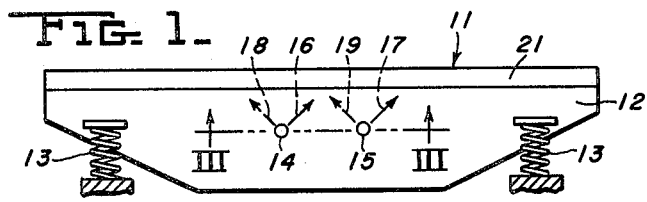
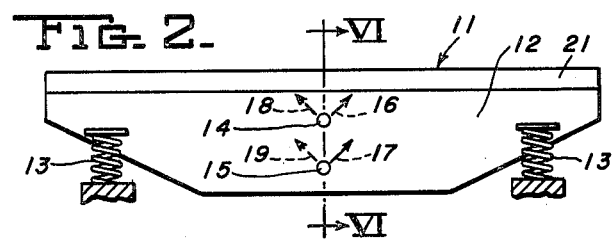
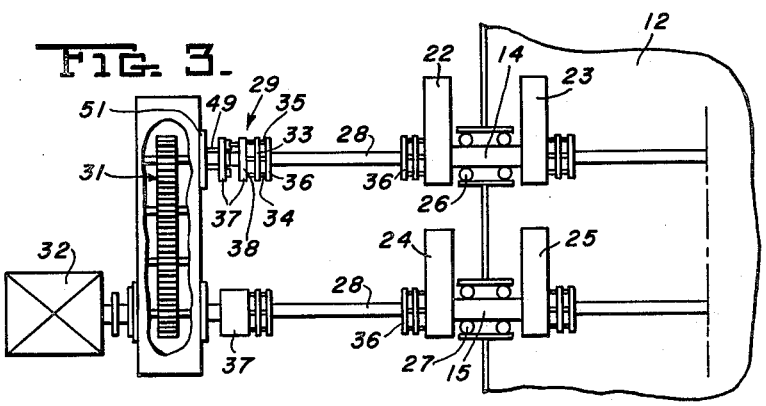
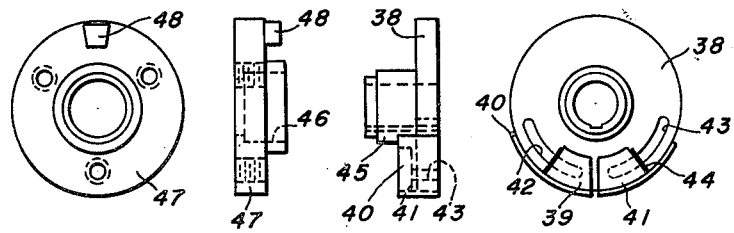

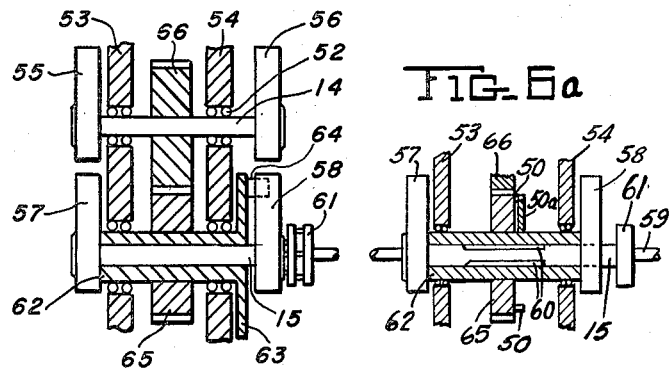
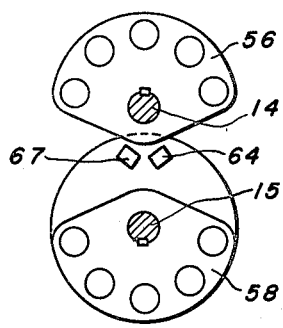
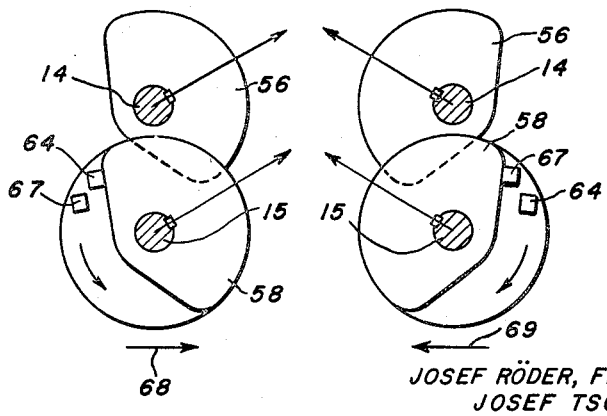
INVENTORS.
JOSEF RÖDER, FRITZ STOFF and
JOSEF TSCHULLIK

3,145,831
VIBRATING CONVEYOR SYSTEM
Josef Röder, Fritz Stoff, and Josef Tschullik, all of Darmstadt, Germany, assignors to Dravo Corporation, Pittsburgh, Pa., a corporation of Pennsylvania
Filed Jan. 24, 1962, Ser. No. 168,440
20 Claims. (Cl. 198—220)

This invention relates to a vibrating conveyor system, and more particularly to a vibrating conveyor system for transporting flowable solids selectively in opposite directions on a freely supported trough by vibration forces effected by unbalanced weight segments.

Imbalanced weight units of a conveyor system are conventionally mounted on parallel contra-rotating coupled shafts with the units being rotatively driven by abutments or stops in pushing engagement therewith. The abutments are attached to an inside wall of a motor driven drum, or to a motor actuated plate or carrier disc whereupon rotation of the drum is imparted to the imbalance units via the abutments on the drum in contact with the units. Generally, two eccentric weight segments comprise an imbalance unit, and at least one of the two units, which are arranged respectively on the parallel shafts of a system, is mounted for free rotation between stops or abutments on the hub of the drum or the carrier disc.

The position of the drive abutments determines the change in the phase of the rotated masses; that is, with the rotary direction of the driving motor reversed, the unbalanced masses on the hub of the drum are swung out of phase by an angle determined by the position of the abutments on the rotated drum. Since the change in phase of the imbalance masses may result in a change in the conveying direction, the reversal of the rotary direction of the drive motor, therefore, determines the conveying direction of the system.

The conveying systems which encompass the structure related briefly hereinabove have failed in operation frequently as a consequence of the eccentric weight segments, which are mounted for rotation by the drum abutments, leading the drive abutments because of the forces of acceleration. Accordingly, control of the change in phase or conveying direction of the eccentric weights brought about when the drive motor is reversed is lost, and the uncontrolled vibrations subsequently destroy or render the conveying system ineffective. In attempts to remedy this undesirable situation, fixing devices have been used in conjunction with the eccentric weight units of the abutments, however, the conveying system is required to be stopped in order for attendants to release these fixing devices and to reset them to limit the phase of the weight segments so as to reverse the conveying direction of the system. Remote reversing of the conveying direction is not possible in the systems heretofore practiced.

The disadvantages of the known conveying systems of the general nature of this invention are overcome by the provision of a damping unit, such as gears or bearings, engaged between the rotating shafts of imbalance units of the system whereupon the force of the damping opposes and exceeds the forces of acceleration to maintain the abutments of the drum in driving contact with the eccentric weights. In this manner the change in phase of the driven weights is controllable which in turn positively maintains constant the change in conveying direction of the system.

The coupling between the drive motor gear train and an imbalance unit is combined structurally in one preferred embodiment of this invention. Optionally, more than one imbalance unit can be driven through the combined coupling and imbalance unit. A hollow shaft onto which are mounted the abutments is driven by an eccentric weight which is motor driven on a shaft concentrically positioned within the hollow shaft. The hollow shaft is geared suitably so as to couple the hollow shaft with another shaft of the conveying system which rotates as imbalance unit in a direction opposite to the direction of rotation of the imbalance unit of the driven shaft extending within the hollow shaft. In this fashion the imbalanced units of both shafts provide the forces which convey and shake the material on the conveyor pan or trough, and the damping achieved through the gear coupling of the shafts insures the driving contact of the eccentric weight with the abutment is maintained.

Alternatively, the coupling between parallel shafts of the eccentric weight units may be entrained in the drive motor gear train which rotates but one shaft. Depending on the type of gears used, a toothed wheel or a belt pulley is mounted on a hollow shaft for rotation freely between abutments on the hollow shafts which contact a finger or stop piece on the gear wheel. Also, the imbalance masses may be attached directly to the hollow shaft and it may be subdivided with each part carrying a pair of imbalance units.

An important feature of the instant invention is the capability of the abutments, or stops, to be positioned selectively on a rotated drum, plate, or disc such that not only a change in the conveying direction is achieved by positive control of the phase of the rotating weight segments, but also a change in the speed of transporting material on the conveyor trough is regulated. This speed may be so controlled by the placement of the abutments on the driver disc that it may be zero for one direction of actuation on the drive motor. This makes it possible to shake the material to be transported without producing conveying forces which impart linear travel of the material on the conveyor tray, and, alternately to convey the material by switching the rotary direction of the drive.

It is an object of this invention to provide a conveying system utilizing forces of imbalance weight units for directional vibration wherein the vibrational forces are controlled in direction or phase.

Another object is the provision of a conveying system with controlled speed of conveying of material achieved by the positive positioning of abutments of a coupling unit between the gear train of a conveyor drive motor and the imbalance weight units which effect the vibration forces.

A further object of the present invention is to provide a coupling in a gear train which dampens or impedes one part of the train which engages together the parallel shafts of imbalance weight units such that the units are controlled in phase when reversal of the conveying direction is made by reversal of the drive motor.

Still another object is the provision of a controlled drive between imbalance weight units of a conveying system whereby quick switching of conveying direction is accomplished from a central switching station without alteration being necessary on the imbalance units to position them relative to one another to achieve a desired phase.

A complete understanding of the invention may be had from the following detailed description of specific embodiments thereof when read in conjunction with the appended drawings, wherein:

FIG. 1 is a schematic of the vibrating conveyor system with two unbalanced weight units arranged on horizontally-spaced parallel axes;

FIG. 2 is a schematic of the conveyor system with two unbalanced weight units arranged on axes vertically spaced;

FIG. 3 indicates a section of the conveyor system taken along line III—III of FIG. 1, but displaced ninety degrees for presentation;

FIGS. 4a, 4b, 5a and 5b are views of details of the drive coupling shown generally in FIG. 3;

FIG. 6 represents in section the conveying system embodiment of FIG. 2 taken along line VI—VI thereof;

FIG. 6a is a modification of the invention;

FIG. 7 is a side elevation of the system of FIG. 5 with the conveyor system in rest condition;

FIG. 8 shows the position of the unbalanced segments in operation for one rotary direction of the conveyor drive motor or conveying direction; and FIG. 9 depicts the position of the unbalanced segments in operation for the opposite conveying direction or drive motor rotation.

Referring now to the drawings, wherein like reference characters designate like or corresponding parts throughout the several views, there is shown in FIGS. 1 and 2 the conveyor system 11 with a vibrating conveyor 12 mounted on springs 13 for free translating motion. The forces of vibration for moving the conveyor 12 are generated by unbalanced weight segments, not shown in FIGS. 1 and 2, which are attached for rotation on parallel shafts 14 and 15 lying in a horizontal plane in FIG. 1 including the horizontal center of gravity line and which are coupled for simultaneous contra-rotation symmetrically to the vertical center of gravity line of the system 11. The unbalanced weight segments are indicated symbolically by arrows 16, 17, 18 and 19. The solid-lined arrow symbols 16 and 17 indicate the conveying direction of material in a conveyor trough 21 when the shafts 14 and 15 are rotated in one direction whereas the dash-lined arrow symbols 18, 19 indicate the conveying direction of material in the trough 21 when the shafts are driven in an opposite direction by reversing the drive motor. The shafts 14 and 15 are synchronously driven by a dampener coupling connected to a drive motor. The embodiment shown in FIG. 2 is the conveying system depicted in FIG. 1, but with parallel shafts 14 and 15 lying in a vertical plane which includes the vertical center of gravity line of the system, and which positions the shafts symmetrical to the horizontal center of gravity line of the system.

The system illustrated in FIGS. 1 and 2 is capable of imparting directional conveying of bulk material on the trough 21 at various rates of speed in the same direction by selectively changing the angle of phase of the rotatable weights or segments such that the resultant force is always in the same direction, but the angle of incidence of the resultant is changed. The angle of incidence is the angle defined between the resultant vector and the horizontal. The conveying speed, with constant frequency and amplitude and with equal bulk material, is determined by the value of the angle of incidence. Consequently, through the selection of the phase of the rotating weights, it is possible to obtain opposite conveying motions upon alternating reversal of the drive motor with equal setting angles of positions of the weights with respect to the shafts, unidirectional conveying at pulsating speeds with unequal setting angles of the weights about the shafts, or opposite conveying motion with various setting angles of the weights depending on the rotary direction of the driving motor. It is possible also to shake and convey the bulk material alternately on the conveyor by setting the phase of the rotating masses to have a resultant in a vertical direction when the rotation of the segments or weights is in one direction, but when rotation of the weights is reversed by the drive motor, the bulk material is conveyed by another resultant force in the conveying direction.

The sectional view of the conveying system shown in FIG. 3, which is a section of FIG. 1 taken along line III—III, includes imbalance masses or weights 22 and 23 attached to the shaft 14 and imbalance masses 24 and 25 connected to the shaft 15. The shafts 14 and 15 are each supported for rotation by bearings 26 and 27, respectively, with the shaft 14 being connected through a universal shaft 28 and a drive unit 29 to a gearing 31 driven by a motor 32. The bearings 26 offer sufficient damping to maintain the weights 22 and 23 at a preset angle. A shaft plate 33 is connected on one side by suitable fasteners such as bolts 34 and 35 to a flange 36 of the universal shaft 28, and on the opposite side to a coupling generally designated 37. The shaft 14 is connected to the universal shaft 28 by a similar shaft flange 36 at its end opposite the drive unit 29. Similarly, the shaft 15 is connected to a universal shaft 28 through a shaft flange 36, and further to a coupling 37. Depending on the value of the desired phase angle change, that is, according to the desired purpose of the assembled conveyor system, the coupling 37 can be made to correspond in structure to the coupling 37 of the drive unit 29 for shaft 14. In the event that the system purpose is not such as to require the design of a coupling 37 for shaft 15, the coupling may be non-adjustable or adjustable only by hand to modify the angle of phase of the rotatable weights 24 and 25 on the shaft 15 with respect to that of the weights 22 and 23 on the shaft 14.

The details of the construction of the coupling 37 are shown in FIGS. 4a, 4b, 5a and 5b. An engagement plate 38, which is connected in FIG. 3 to the shaft plate 34, is provided with abutments or stops 39 and 41 which are adjustably positioned by fasteners, not shown, along arcuate slots 42 and 43 provided in the plate 38 and are guidingly held by an arcuate wall 40 upstanding from the plate 38. The stops 39 and 41 preferably are clad with rubber 44 or other resilient material. The hub 45 of the plate 38 is mounted for rotation within a bore 46 of a drive plate 47 on the inner peripheral area of which is fixed a driver abutment 48. The abutment 48 may be clad in a resilient jacket of rubber or other resilient material, but it is preferred that either the stops 39 and 41 or the drive abutment 48 be clad in order to prevent undue wear of these parts when repeatedly brought together forcefully. The drive plate 47 is connected by means of fasteners such as bolts 49 to a gearing arbor 51 driven by the gearing 31 of the motor 32. Accordingly, when the drive plate 47 is driven by the motor and gearing, the drive abutment 48 pushes against either stop 39 or 41 depending on the direction of rotation of the drive plate 47. The imbalance segments 22 and 23 are thus rotated through their fixed connection to the shafts 28 and 14 at a predetermined angle with respect to the polar position of the imbalance units 24 and 25 fixed on shaft 15 which are rotated simultaneously by gearing 31 but in opposition to the direction of rotation of the segments 22 and 23.

The sectional view in FIG. 6 of the conveyor system shown schematically in FIG. 2 has the vertically spaced parallel shafts 14 and 15 with the shaft 14 being mounted for rotation within bearings 52 of side wall supports 53 and 54. Connected fixedly to shaft 14 are imbalance masses 55 and 56; similarly, masses 57 and 58 are fixed to the shaft 15 which is coupled to a drive shaft 59 by the shaft plate 61. The shaft 15 in this modification is supported for rotation within a hollow shaft 62 provided with a circumferential flange 63 to which is attached a stop 64 at a peripheral zone on the outer face of the flange. The unbalanced weight 58 serves as a drive unit by being disposed with respect to the flange 63 such that the stop 64 lies in the path of travel of the weight 58 when rotated through the drive shaft 59 and shaft 15. In this fashion, the weight 58 bears against the stop 64 and drives the hollow shaft 62.

Attached for rotation with the hollow shaft 62 is a toothed wheel 65 which meshes with the teeth of a spur gear 66 to rotate the shaft 14 synchronously, but in opposite direction, with the rotation of the shaft 15. It is readily apparent that the toothed wheel 65 may be provided with stops 50, FIG. 6a, instead of the flange 63. The stops 50 are positioned in the path of an abutment 50a adjustably fixed on the shaft 62 which drive the stops 50 to rotate the gear 65. The driver is then attached to the hollow shaft 62 via keys 60 and shaft 15 rather than utilizing the weight 58, as in FIG. 6, and the wheel 65 would be mounted on the shaft 62 for limited free rotation.

Of course, the connection between the gear 66 and the shaft 14 may be accomplished in a similar fashion by the provision of stop members on the gear and abutments on the shaft 14 to be engaged by these members. Further, the hollow shaft 62 may be formed in two sections with each partial hollow shaft having an unbalanced weight segment at each end to maintain the load on the bearings symmetrically.

FIG. 7 is an end view of FIG. 6 with the positions of the unbalance weight segments 56 and 58 shown in location when the system is at a rest condition. The shaft 15 and the segment 58 are driven as a unit by the motor 32, and with clockwise turning of the motor the flange 63 is driven by engagement of the weight 58 with the stop 64. With counterclockwise rotation of the motor 32 a stop 67 is engaged by the weight 58 to rotate the hollow shaft 62 and the wheel 65 as a unit in an opposite direction of rotation from that occasioned when the engagement of stop 64 by the weight 58 is effected.

The positions of the unbalance weights in opposite rotational aspects of the shaft 15 are shown in FIGS. 8 and 9. In FIG. 8 the weight segment 58 is driven counterclockwise and engages the stop 64 to rotate the hollow shaft 62 counterclockwise.

With counterclockwise rotation of the weight segment 58 the direction of conveying is from left to right, as illustrated in FIG. 8 by the arrow 68. The condition of clockwise rotation of shaft 15 is depicted in FIG. 9 wherein the weight 58 pushes against the stop 67 to rotate the hollow shaft 62 in a clockwise direction. The direction of conveying here shown is from right to left as indicated by the arrow 69.

The instant invention provides adjustably positionable stops on a disc which are engaged drivingly by an eccentric weight, as in the modification illustrated in FIGS. 2, 6, 7, 8 and 9; or the stops drive the weights as in the embodiments of FIG. 1 with the coupling details of FIGS. 3, 4a, 4b, 5a and 5b. A change of phase is accomplished by varying the angular displacement of the stops, and, when the motor drive is reversed, the conveying direction is reversed.

It is manifest that many modifications and variations of the present invention are possible in the light of the above teachings without departing from the spirit and scope of the invention. For example, the stops described herein in connection with the drive coupling between unbalanced weight units on parallel shafts may be arranged in a drum, on lever arms, or designed otherwise as driving fingers.

What is claimed is:
1. A conveying system for selective two-directional transportation of material comprising a conveyor trough, a pair of parallel shafts attached to the trough, eccentric weight segments fixed to each shaft for rotation therewith, connecting means attached to each shaft and in engagement with one another for synchronous contra-rotation of the shafts, drive means, and coupling means connected between one of the shafts and the drive means for rotating the one shaft and its weight segments with respect to the other shaft and its weight segments prior to the transmission of the drive through the connecting means to the other shaft whereupon synchronous contra-rotation occurs with the weight segments of the one shaft maintained at a predetermined angle with respect to the weight segments of the other shaft.

2. A conveying system as in claim 1 wherein the coupling means includes means for limiting the relative displacement of the weight segments of the one shaft with respect to the weight segments of the other shaft, the limiting means being adjustably positioned with respect to the position of the weight segments of the one shaft.

3. A conveying system as in claim 2 wherein the coupling means includes a drive member in engagement with one of the limiting means for rotating the one shaft with the weight segments at an attitude with respect to the segments on the other shaft determined by the position of the one of the limiting means.

4. A conveying system as in claim 1 wherein one of the weight segments of the one shaft is connected to the drive means, and the coupling means includes a driven means engaged to the one weight segment and to the connecting means for rotating the shafts synchronously in contra-rotation.

5. A conveying system comprising a conveyor trough supported for conveying in opposite directions along a common axis; a pair of shafts arranged in parallel and attached to the conveyor trough; an eccentric weight unit fixed to each shaft; a drive motor; gearing connected to the motor and to each shaft for synchronous contra-rotation of the shafts; a coupling connected between one of the shafts and the gearing including a disc having spaced stops adjustably positioned on one side of the disc, the other side of the disc being connected to the one shaft, a plate having an abutment on one face in the path of travel of the stops on the disc and being connected to the gearing on the other face whereby the abutment is driven by the gearing to engage the stops positioned on the disc and rotation is imparted to the one shaft with the weight unit thereon positioned relative to the weight unit of the other shaft by the point of engagement of the abutment and stops; the degree of damping afforded by the gearing maintaining the abutment in driving engagement with the stops.

6. A conveying system as in claim 5 wherein the spaced stops are positioned such that reversal of the drive motor rotation imparts conveying in opposite directions at equal speeds with an equal angle setting of the stops from a plane which includes the shafts.

7. A conveying system as defined in claim 5 wherein the stops are spaced such that conveying motions occur in one direction and at one speed when the drive motor is rotating in one direction, and conveying occurs in an opposite direction and at a different speed when the drive motor is reversed.

8. A conveying system as in claim 5 wherein the stops are spaced such that the conveying motions imparted to the trough are maintained unidirectional but at unequal speeds when reversal of the drive of the motor is effected.

9. A conveying system as in claim 5 wherein the stops are spaced such that with one rotary direction of the drive motor conveying motions in one direction are imparted to the trough, and with the opposite rotary direction, in-place shaking of material on the conveyor trough is effected.

10. A conveying system comprising a conveyor trough supported for conveying opposite directions along a common axis, a pair of shafts arranged in parallel and attached to the conveyor trough, an eccentric weight unit of at least two unbalanced masses fixed to each shaft, a drive motor connected to one of the shafts, a hollow shaft, the one shaft being supported within the hollow shaft for relative rotation and simultaneous rotation therewith, the hollow shaft having a circumferential flange adjacent one of the imbalance masses of the eccentric weight unit of the one shaft, stops on the circumferential flange extending into the path of travel of the one unbalanced mass and rotatively driven by the mass, connecting means attached to the hollow shaft and to the other shaft for transmitting the rotation of the hollow shaft to the other shaft, relative rotation between the one shaft and the hollow shaft being limited by the point of engagement of the one mass with the flange stops thereby setting the angle of the eccentric weight unit of the one shaft with respect to the unit of the other shaft, and the damping effected by the connecting means maintaining the driving engagement between the one mass and the stops.

11. A conveying system as in claim 10 wherein the spaced stops are position such that reversal of the drive motor rotation imparts conveying in opposite directions at equal speeds with an equal angle setting of the stops from a plane which includes the shafts.

12. A conveying system as in claim 10 wherein the stops are spaced such that conveying motions occur in one direction and at one speed when the drive motor is rotating in one direction, and conveying occurs in an opposite direction and at different speed when the drive motor is reversed.

13. A conveying system as in claim 10 wherein the stops are spaced such that the conveying motions imparted to the trough are maintained undirectional but at unequal speeds when reversal of the drive of the motor is effected.

14. A conveying system as in claim 10 wherein the stops are spaced such that with one rotary direction of the drive motor conveying motions in one direction are imparted to the trough, and with the opposite rotary direction, in-place shaking of material on the conveyor trough is effected.

15. A conveying system which comprises a conveyor trough mounted for conveying in opposite directions along a common axis, parallel shafts attached to the trough, an unbalanced weight unit fixed on each shaft, a drive motor coupled to one shaft, a hollow shaft concentrically and fixedly positioned on the one shaft, a toothed wheel mounted for rotation on the hollow shaft, spaced stop means on the wheel, means on the hollow shaft for engaging the spaced stop means to drive the latter, and connecting means engaged to the wheel and to the other shaft for transmitting rotation of the wheel to the other shaft, the degree of damping by the connecting means maintaining the driving contact of the engageing means and the wheel stop means.

16. A conveying system as in claim 15 wherein the spaced stops are positioned such that reversal of the drive motor rotation imparts conveying in opposite directions at equal speeds with an equal angle setting of the stops from a plane which includes the shafts.

17. A conveying system as in claim 15 wherein the stops are spaced such that conveying motions occur in one direction and at one speed when the drive motor is rotating in one direction, and conveying occurs in an opposite direction and at a different speed when the drive motor is reversed.

18. A conveying system as in claim 15 wherein the stops are spaced such that the conveying motions imparted to the trough are maintained undirectional but at unequal speeds when reversal of the drive of the motor is effected.

19. A conveying system as in claim 15 wherein the stops are spaced such that with one rotary direction of the drive motor conveying motions in one direction are imparted to the trough, and with the opposite rotary direction, in-place shaking of material on the conveyor trough is effected.

20. A conveying system which comprises a conveyor trough mounted for conveying in opposite directions along a common axis, a first shaft, a second shaft connected to the trough parallel to the first shaft, a drive motor coupled to the second shaft, a hollow shaft concentrically and fixedly position on the second shaft and divided into two axially aligned sections, an unbalanced weight fixed at the ends of each hollow section, the hollow shaft sections being supported for rotation intermediate their respective ends, an unbalanced weight unit fixed to the first shaft, a toothed wheel mounted for rotation on one section of the hollow shaft, spaced stop means on the wheel, means on the one section of the hollow shaft for engaging the spaced stop means to drive the wheel, and connecting means engaged to the wheel and to the first shaft for transmitting rotation of the wheel to the first shaft, the degree of damping by the connecting means maintaining the driving contact of the engaging means and the wheel stops.

References Cited in the file of this patent

FOREIGN PATENTS 278,581  Italy _____ Oct. 14, 1930